United States Patent [19]
Baker

[11] 3,950,548
[45] Apr. 13, 1976

[54] ICE CREAM AND FRUIT CONFECTIONERY PRODUCT

[76] Inventor: Phillip E. Baker, Route No. 2, Box 133, Georgetown, Ohio 45121

[22] Filed: July 3, 1975

[21] Appl. No.: 592,802

[52] U.S. Cl. .................. 426/91; 426/101; 426/102; 426/134; 426/139; 426/281; 426/284; 426/421
[51] Int. Cl.² ..................... A23G 9/00; A23L 1/212
[58] Field of Search ............. 426/91, 100, 101, 102, 426/104, 134, 279, 280, 281, 282, 284, 565, 570, 572, 660, 421, 139, 143, 484, 485

[56] References Cited
UNITED STATES PATENTS

| | | | |
|---|---|---|---|
| 1,672,718 | 6/1928 | Graefe | 426/484 |
| 2,924,529 | 2/1960 | Renner | 426/104 |
| 2,929,721 | 3/1960 | Mitzenmacher | 426/134 |
| 3,264,119 | 8/1966 | McIlvaine | 426/282 |
| 3,459,296 | 8/1969 | Berg | 426/134 |

Primary Examiner—Norman Yudkoff
Assistant Examiner—Curtis P. Ribando
Attorney, Agent, or Firm—Wood, Herron & Evans

[57] ABSTRACT

An ice cream and fruit confectionery product that is mounted on a stick. A hole is bored in edible fruit to remove at least a portion of the fruit's core. The fruit is mounted on the stick with the bored hole being disposed substantially coaxial to the stick's handle, a seat being provided on top of the stick to hold the fruit in position thereon when the stick is held vertically upright by a user. The seat includes an upstanding annular wall interengaged with the fuit when the fruit is seated on the stick. Thus, the fruit is restrained from axial downward movement relative to the stick when the stick is held upright by the seat's floor, and is restrained from transverse movement relative to the stick by the upstanding annular wall. The bored-out core of the fruit is filled with ice cream, the ice cream also being supported from underneath by the seat's floor if the hole has been bored completely through the fruit.

10 Claims, 3 Drawing Figures

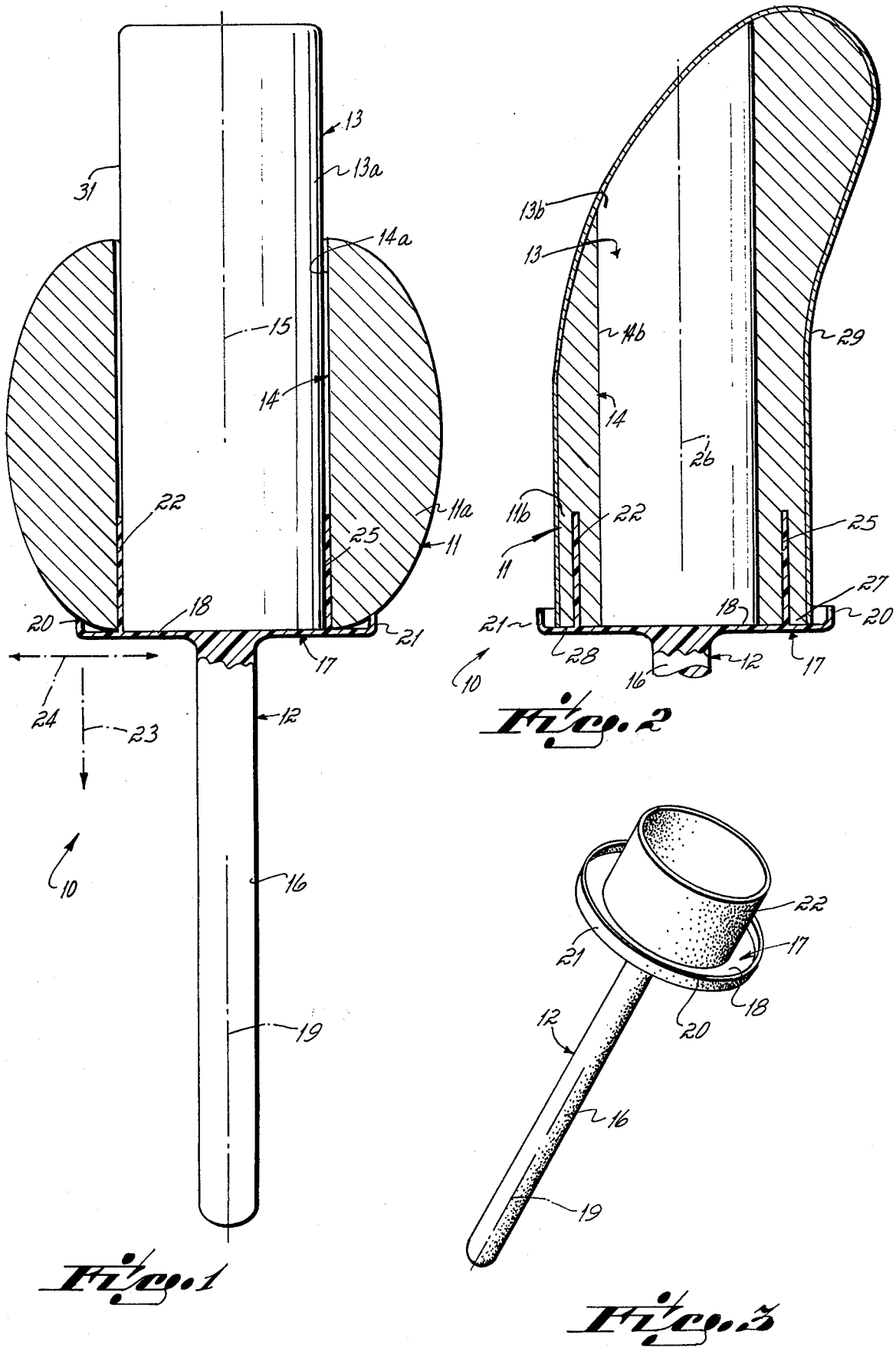

ICE CREAM AND FRUIT CONFECTIONERY PRODUCT

This invention relates to confectionery products. More particularly, this invention relates to a confectionery product comprised of ice cream and fruit mounted on a stick.

Confectionery products are, of course well known to the art, such products having been marketed for untold numbers of years. Further, confectionery products on a stick are well known to the prior art. One typical confectionery product on a stick, which is well known in today's marketplace, is ice cream frozen on a stick, the ice cream being coated with chocolate or a flavored sherbet or a frozen colored sugar water. Another typical confectionery product on a stick is sugar water by itself frozen on a stick, the water being colored with any one of numerous colors. Such frozen stick confectionery products are sold in great quantity in this country, and are considered dessert type foods by persone of all ages, but particularly by children.

The primary objective of this invention has been to provide a novel and tasty frozen stick confectionery product comprised of ice cream and a fruit mounted on a stick-type holder. In accord with this objective, the confectionery product of this invention, in broad form, comprises an edible fruit having a hole bored therethrough to remove at least a portion of the fruit's core. The fruit is mounted on a stick with the bored hole being disposed substantially coaxial to the stick's handle, a seat being provided on top of the stick to hold the fruit in position thereon when the stick is held vertically upright by a user. The seat includes an upstanding annular wall interengaged with the fruit when the fruit is seated on the stick. Thus, the fruit is restrained from axial downward movement relative to the stick when the stick is held upright by the seat's floor, and is restrained from transverse movement relative to the stick by the upstanding annular wall. The bored out core of the fruit is filled with ice cream, the ice cream also being supported from underneath by the seat's floor if the hole has been bored completely through the fruit.

Other objectives and advantages of this invention will be more apparent from the following detailed description taken in conjunction with the drawings in which:

FIG. 1 is a cross-sectional view illustrating the confectionery product of this invention using a peach;

FIG. 2 is a cross-sectional view illustrating the confectionery product of this invention using a banana; and FIG. 3 is a perspective view showing the stick used with the confectionery product of this invention.

The frozen stick confectionery product 10 of this invention basically includes, as shown in FIG. 1, a fruit 11 seated on a stick 12 with ice cream 13 provided in the hollow center bore 14 of the fruit. The frozen confectionery product shown in FIG. 1 makes use of a peach 11a that has been cored along center axis 15 completely through the peach to remove the peach pit (not shown) thereby providing a cylindrical bore or hole 14a through the center of the fruit. The peach 11a and ice cream 13a are mounted on the stick 12 more particularly illustrated in FIG. 3.

The stick 12 itself comprises a handle 16 portion, and a seat 17 portion. The seat 17 portion includes a circular floor 18 transversely disposed relative to the axis 19 of the handle, the seat's floor being of a large enough diameter to permit the peach 11a to be adequately supported thereon when the stick is held vertically upright (as shown in FIG. 1) by a user. The outer periphery of the seat's floor 17 may be provided with an upstanding lip 20 which helps in preventing the fruit's juices from overflowing the periphery 21 of the seat's floor down onto the handle 16 which is, of course, manually gripped by the user. Note particularly that the stick 12 structure further includes an upstanding circular wall 22 coaxially disposed with the stick's handle, the wall extending upwardly from the seat's floor 18 a distance approximately equal to the seat floor's radius. The peach 11a is preferably cylindrically cored so that the inside diameter of the peach's bore 14a is at least equal to or only slightly greater than the outside diameter of the circular wall 22 which upstands from the stick's seat. Generally speaking, and in other words, the inside geometric configuration of the fruit's bore 14 is preferably the same as the outside geometric configuration of the stick's wall 22, and the cross-sectional area of the fruit's bore is at least about the same as (but may be slightly greater than) the cross-sectional area of the wall 22 as measured at the wall's outer periphery. The peach 11a is seated on the stick 12 in seat 17 in such a manner that the peach's bore 14a is coaxially aligned with the stick's handle 12. When the stick 12 is held vertically upright (as shown in FIG. 1), as would be the case when a user is eating the confectionery product, the seat's floor 18 supports the fruit against vertically downward motion (indicated by phantom arrow 23) and the seat's annular wall 22 supports the peach against horizontal or transverse motion (indicated by phantom arrow 24). In other words, the peach 11a is securely held on the stick as long as the stick is held vertically upright, i.e., the peach will not fall off the stick because of its interengagement with the seat's floor 18 and the seat's annular wall 22.

The fruit 11 and the stick 12 comprise two of the basic parts of the three-part confectionery product of this invention. The third part is ice cream 13, and the ice cream 13 is provided in the bore 14 of the fruit 11 when the fruit 11 is cored therethrough from one side to the other (as is illustrated with the peach 11a), the ice cream is supported on the stick 12 from the underside by the seat's floor 18, and is carried to a partial extent within the well 25 defined by the seat's annular wall 22. The ice cream may be filled to the top of the fruit's bore 14b flush with the fruit's outside surface (as shown in FIG. 2 with the banana 11b), or may be frozen to extend upwardly out of the fruit's bore 14a beyond the fruit's surface (as shown in FIG. 1 with the peach 11a).

FIG. 2 shows a confectionery product in accord with the principles of this invention that makes use of a cored banana 11b, the banana having been cored along its approximate longitudinal axis 26, and cut off at one end 27 so that a flat surface 28 is provided on one end of that banana which is transverse to the axis 26 of the banana's bore 14b. However, and in the case of the banana 11b, note that the bore 14b is only about one-half the diameter of the outside diameter of the stick's wall 22 (the same stick 12 may be used for the banana 11b as for the peach 11a, if desired). The banana 11b is then seated on the seat's floor 18 in the same manner as the peach 11a was so seated, i.e., coaxially with the stick's handle axis 19, except that the wall 22 extends up into the fruit itself. In this banana embodiment, therefore, the banana 11b is interengaged with the stick's wall 22 on both the inside and outside of that wall, instead of just on the outside as was the case with the peach 11a embodiment. Such an interengagement is easily possible because of the soft nature of the banana 11b fruit. The banana 11b embodiment of the frozen stick confectionery product is likewise provided with ice cream 13b in the banana's bore 14b. In the banana 11b Embodiment the banana's bore 14b is filled with ice cream, but the ice cream is not extended out beyond the banana's surface as was the case with the ice cream/peach embodiment shown in FIG. 1. In the banana 11b embodiment, the banana and ice cream combination may be coated with a chocolate 29 or other confectionery coating after mounting on the stick.

The fruits adapted for use with the confectionery product of this invention are those which are commonly sold as fruits to the American consumer. Such fruits, as a class, may generally be thought of as fleshy edible fruits. The majority of such fruits are of the type grown on deciduous fruit trees in the temperate zone, e.g., apples, peaches, pears, plums, apricots and nectarines. However, certain of the cirtus fruits such as oranges, tangerines or the like may also be used. Of course, and as is particularly illustrated in this application, the banana, which is a tropical fruit, may also be used in the confectionery product of this invention. The fruits used in the confectionery product of this invention may be cored by any of the many fruit coring devices known to the art.

The ice cream used in the confectionery product of this invention may be either hard ice cream or soft ice cream as those terms are known and understood in the ice cream industry; for purposes of this invention, ice cream is also understood to include ice milk. Basically, a hard ice cream is one that is frozen and then packaged for sale, the hard ice cream thereafter being stored in a freezer until marketed by the retailer and, once purchased by the consumer, thereafter being stored in, e.g., a home freezer, until completely used by the consumer. On the other hand, a soft ice cream is one that, while having a somewhat solid consistency as emitted from the freezer, is generally sold direct to the user from the freezer for immediate consumption in single dessert quantities. In addition, sherbets or ices may also be used.

There are a couple of methods of producing the frozen stick confectionery product of this invention. The first method, and for the peach 11a, includes the steps of freezing a cylindrical stick of hard ice cream 13a (having an outside diameter 31 no greater than about the outside diameter of the stick's annular upstanding wall 22) in place coaxially with the stick's handle 16, i.e., freezing the ice cream into the seat's well 25. This, of course, freezes the ice cream 13a to the stick and makes it, in effect, a one-piece structure. Subsequently, the cored peach 11a is slid down over the cylindrical ice cream 13a until the fruit is supported on the seat's floor 17. In practice, and at, e.g., a retail single dessert type sales location, a plurality of such frozen hard ice cream/stick combinations may be prepared and stored in a freezer, the peaches being stored separately. The peaches are then cored and, thereafter, assembled onto the ice cream/stick combination as orders are received from customers. A second method, and for the banana 11b, includes the steps of first coring the banana and then freezing that banana onto the stick 12. Subsequently, ice cream, for example, soft ice cream 13b, may be flowed into the prefrozen banana/stick structure. In practice, and at, e.g., a retail single dessert type sales location, a plurality of such frozen banana/stick combinations may be prepared and stored in a freezer, the soft ice cream being stored separately. The soft ice cream is then assembled or cast into the cored banana/stick combination as orders are received from customers.

Having described in detail the preferred embodiments of my invention, what I desire to claim and protect by Letters Patent is:

1. A confectionery product comprising
   a stick having a handle and a seat,
   a fruit having a bore therein, said fruit being carried on said seat, and
   at least one of an ice cream, a sherbet and/or an ice at least partially filling said fruit's bore.

2. A confectionery product as set forth in claim 1, said seat including a floor disposed substantially transverse to said handle and an annular wall mounted on said floor, the inside geometrical configuration of said fruit's bore being about the same as the exterior geometrical configuration of said annular wall, the inside cross sectional area of said fruit's bore being at least about the same as the external cross-sectional area of said annular wall as measured at said wall's outer periphery, and said fruit being seated on said stick's floor with said annular wall extending at least part way into the bore of said fruit, thereby interengaging said fruit with said stick.

3. A confectionery product as set forth in claim 1, said seat including a floor disposed substantially transverse to said handle and an annular wall mounted on said floor, the inside crosssectional area of said fruit's bore being substantially less than the external cross-sectional area of said annular wall as measured at said wall's outer periphery, and said fruit being seated on said stick's floor with said annular wall extending at least part way up into said fruit, thereby interengaging said fruit with said stick.

4. A confectionery product as set forth in claim 2 wherein said annular wall is substantially coaxially disposed with said handle, and said fruit's bore is substantially coaxially disposed with said handle.

5. A confectionery product as set forth in claim 3 wherein said annular wall is substantially coaxially disposed with said handle, and said fruit's bore is substantially coaxially disposed with said handle.

6. A confectionery product as set forth in claim 1 wherein said fruit is selected from the group consisting of peaches and bananas.

7. A confectionery product as set forth in claim 1 wherein said ice cream is selected from the group consisting of hard ice cream and soft ice cream.

8. A method of forming a confectionery product comprised of a stick, a fruit, and at least one of an ice cream, a sherbet and/or an ice, comprising the method steps of
   providing a stick having a seat disposed substantially transverse thereto,
   at least partially coring said fruit to define a hole therein,
   mounting one of said cored fruit and said ice cream, sherbet or ice to said stick, and
   thereafter mounting the other one of said cored fruit and said ice cream, sherbet or ice to said stick.

9. A method as set forth in claim 8 wherein said cored fruit is first frozen to said stick, and said ice cream, sherbet or ice is thereafter provided within the bore formed in said cored fruit.

10. A method as set forth in claim 8 wherein said ice cream, sherbet or ice is first frozen to said stick, and said cored fruit is thereafter slipped over said ice cream, sherbet or ice into seated relation with said stick's seat.

* * * * *